Oct. 21, 1924.                                            1,512,535
P. HANSMANN ET AL
ANTI-SIDE-DRAFT PLOW
Filed Feb. 14, 1921            2 Sheets—Sheet 1
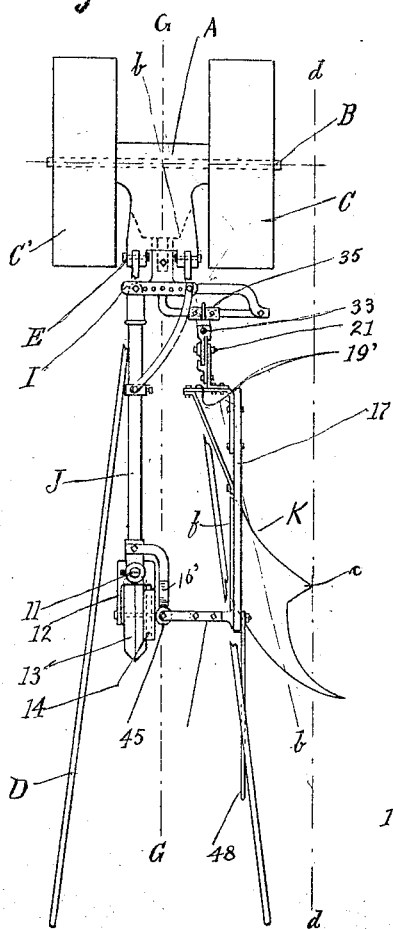
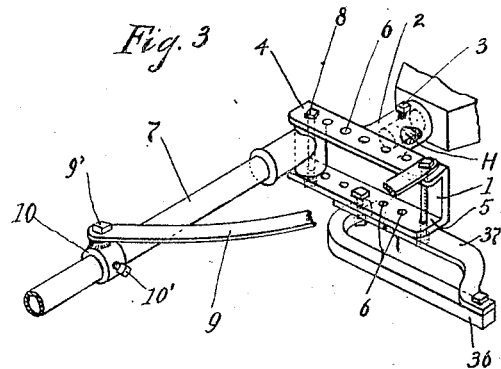
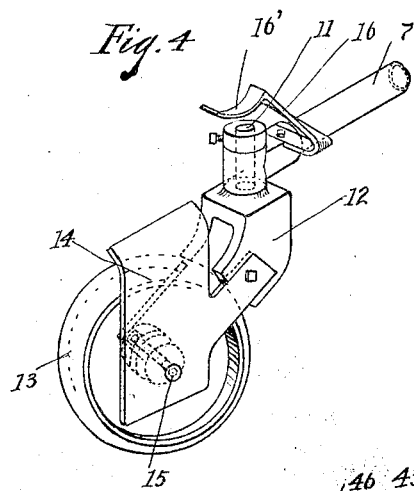
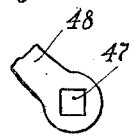
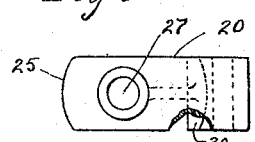
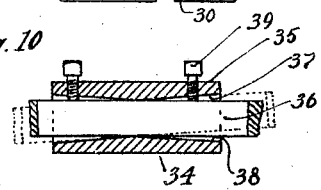
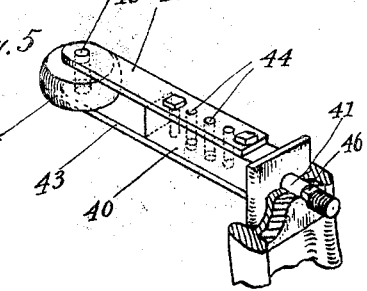
Inventors,
Paul Hansmann
Herman Strack
by A. J. Johnson
their Attorney.

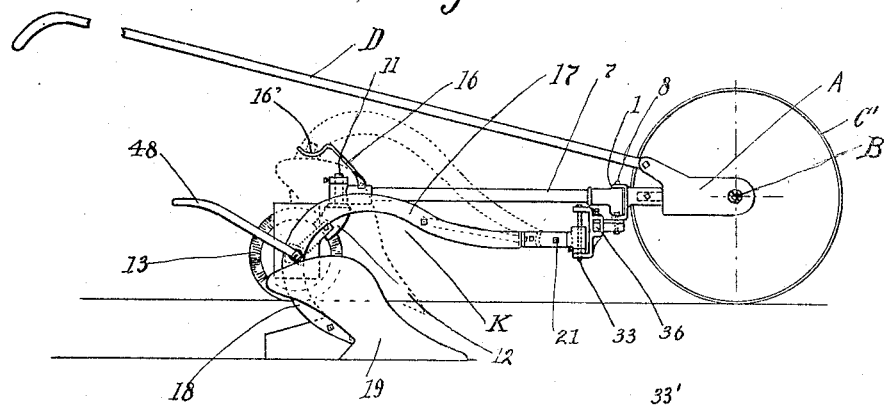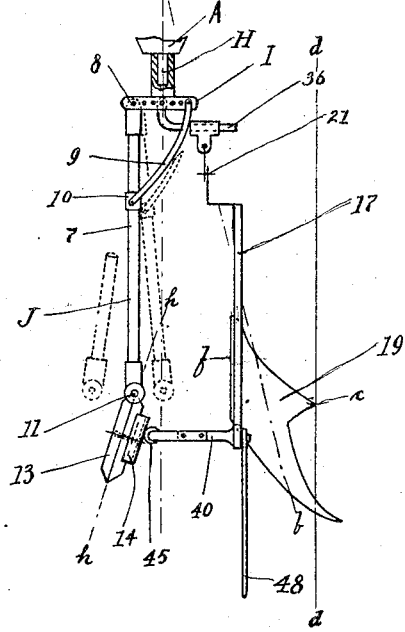

Patented Oct. 21, 1924.

1,512,535

UNITED STATES PATENT OFFICE.

PAUL HANSMANN AND HERMAN STRACK, OF LONG PRAIRIE, MINNESOTA, ASSIGNORS, BY MESNE ASSIGNMENTS, TO THE UNIVERSAL TILLER CORPORATION, A CORPORATION OF DELAWARE.

ANTI-SIDE-DRAFT PLOW.

Application filed February 14, 1921. Serial No. 444,950.

*To all whom it may concern:*

Be it known that we, PAUL HANSMANN and HERMAN STRACK, citizens of the United States, residing at Long Prairie, in the county of Todd and State of Minnesota, have invented certain new and useful Improvements in Anti-Side-Draft Plows, of which the following is a specification.

This invention relates to plow hitches for use in connection with, what are known, as garden tractors, of which the well known Beeman tractor is a type.

This tractor, in connection with which our invention is shown, comprises a power unit, supported by and operatively connected with a pair of traction wheels, and a rearwardly extending handle, for bodily swinging the traction wheels, (in the process of steering) around a pivot point located midway between them. This two wheel tractor, is usually provided with removable trailing casters for stabilizing the body of the tractor, the operator walking on the ground and directing the tractor after the manner of a lawn mower. As these tractors are of narrow gauge, the body stands at a considerable angle, when one of the traction wheels is running in the furrow, in the process of plowing, resulting in undue side wear of the engine parts, strenuous efforts on the part of the operator in controlling the tractor, and not infrequently in tipping over.

The principal object of our invention is to provide a simple, compact and effective plow hitch, which may be readily attached to the tractor, and whereby the traction wheels are enabled to travel on unplowed ground in the process of plowing, our improved hitch embodying certain novel features of construction, whereby a plow, hitched in offset operative position, relative to the center of draft of a tractor of the class described, will be effectively engaged by the stabilizing element of the tractor, to eliminate side draft at the land side of the plow. As is well known, side draft, or, in other words, lateral pressure of the plow against the wall of the furrow, is the result of the natural tendency of the plow to travel in a resultant direction toward the center of draft of the tractor, in its endeavor to align itself longitudinally with its pivotal attachment to the tractor.

By adapting the usual stabilizing caster to perform this function, the general construction is greatly simplified and cheapened as to manufacture.

Other advantages of the invention will be pointed out as they appear in the course of the specification, one form of the invention consisting in the construction, combination and arrangement of parts hereinafter described and claimed.

In the accompanying drawings:

Figure 1 is a semi-diagrammatic top view of a Beeman tractor equipped with the invention, only the body and steering handle of the tractor being shown.

Figure 2 is a side view of same.

Figure 3 is a fragmentary perspective view of the draw head of our improved plow hitch, showing the method of attaching parts of the details.

Figure 4, is a perspective view of the stabilizing caster wheel.

Figure 5 is a perspective view of the plow frame extension arm.

Figure 6 is a perspective view of the plow frame connection for connecting the plow to the tractor.

Figure 7 is a sectional view on line 7—7 of Figure 6.

Figure 8 is a top view of the vertically swingable interlocking member of the plow frame connection.

Figure 9 is a top view of a part of the plow frame connection interlocking with the part shown in Figure 8.

Figure 10 is a sectional view on line 10—10 of Figure 6.

Figure 11 is a semi-diagrammatic view of the invention and

Figure 12 is a side view of the plow lifting handle.

In the drawings, A designates the frame of the tractor, B the axle and C and C' the traction wheels driven by a power unit not shown. D designates the rearwardly extending steering handle having pivotal connection E with the frame, so that it will swing in a vertical plane coincident with the longitudinal axis of the tractor.

By moving the outer extremity of the handle laterally, the body of the tractor will turn on the central pivot F, which latter is situated at the intersection of the axis of the shaft B, and the longitudinal axis or tractor draft line G—G. Projecting rearwardly from the frame A, and coincident with the axis G—G, is the stub shaft H, of uniform diameter, and adapted to support the usual garden implements, including a plow.

Having shown the invention in connection with a Beeman tractor, we have utilized the stub shaft as a connecting means.

The invention comprises a draw head I positioned in the tractor draft line, a ground element J, and a plow K. The draw head comprises in part, a horizontally disposed channeled head 1, extending transversely of the tractor, the channel thereof facing rearwardly, said head formed with a hub 2, suitably bored to removably fit over the stub shaft H, (Fig. 3) said hub having a suitable set screw fastening 3 whereby the head may be firmly held positioned. The upper and lower flanges 4 and 5 of the head are provided with spaced bolt holes 6 in vertical register. The ground element J, which functions in part as a stabilizer caster for the tractor, comprises a rearwardly extending tongue 7, pivoted to swing in a horizontal plane on the pivot bolt 8 in one of the holes 6, said tongue being braced by the brace member 9 bolted to the draw head, and having cap screw connection 9' with the sleeve 10, the latter slidable on the tongue 7, and having suitable set screw fastening 10' whereby to be firmly held positioned. Obviously, by sliding the sleeve along the tongue, the angular position of the latter with respect to the head I, may be changed when desired.

At its free end, the tongue 7 rotatably supports the vertically disposed shank 11 of the fork 12, which latter rotatably supports the ground wheel 13 the periphery of the latter being preferably V-shaped to cut into the soil. The inner side member 14 of the fork 12, is comparatively wide, and extends a distance above and below the spindle 15 of the wheel, so as to constitute a shield or pallet presenting a smooth outer surface. Extending upwardly and rearwardly from the top of the tongue 7, is the plow support 16, formed with a concaved seat 16' the purpose of which will be hereinafter described.

The plow K, comprises a frame, consisting of a beam 17, a sheth portion 18, and the share 19, the beam being constructed at its forward end with a forwardly facing shoulder 19' at right angles to the plow frame, said shoulder having bolted on its face connecting mechanism consisting of a vertically swingable connecting member 20, pivoted on the beam pivot bolt 21, the latter extending through the plates 22 and 23, so as to hold said plates and connecting member positioned flatly against one another, as shown. The plate 22 is formed with an outstanding lug having a groove 24 in its side, said groove being adapted to receive slidably, peripherally, the end 25 of the connecting member 20. Centrally, the plate 22 has a centrally bored boss 26, rotatable in the bore 27 of the connecting member 20. A suitable washer 28 overlaps the bore 27, and serves, when the bolt 21 is in position, to keep the connecting member positioned flatly against the plate 22. The under face 29 of the connecting member extends forwardly to the bottom of the groove 30, the latter receiving slidably, the forward end 31 of the plate 22.

Thus, the connecting member may be rotated in a plane parallel with that of the plow frame, the latter being firmly bolted to the plate 22.

By rotating the connecting member 20, to a position at right angles to the plate 22, said member may be slipped off the boss 26, when the bolt is removed, the plate and member being pivotally interlocked, when their respective grooves 24 and 30 engage the ends 25 and 30.

Forward of the pivot 21, the connecting member is pierced by the vertical bore 32, which latter slidably receives the plow pivot pin 33, whereon the plow may swing laterally, said plow pivot being comparatively long to permit the plow to be adjusted vertically to cut furrows of varying depths. The plow pivot pin is mounted in a yoke formed by a pair of vertically aligned lugs 33' extending rearwardly from the housing 34, the housing being formed near the top of the yoke and forward thereof, with a horizontally disposed, rectangular, long sleeve 35, said sleeve slidably receiving the cross bar 36, the latter extending at right angles to the tractor draft line, and being firmly bolted to the under surface of the flange 5 of the draw head of which it forms a part, a suitable brace 37 for the bar being provided. The plate 23, is bent outwardly at right angles, whereby it is firmly bolted to the forwardly directed surface of the shoulder 19' at the end of the plow beam. As stated in the foregoing, the plow tends to travel in longitudinal alignment with its pivotal connection with the tractor. In Figure 1, the line b—b designates a direction in which the plow tends to travel, it being noted, that the plow pivot 33 is shown situated in this line. To locate the plow pivot on said resultant line and at the same time, have the tip c of the share cut to the wall of the furrow, designated by the line d—d, the bracket forming the shoulder 19' is provided, so that the plow connection may be mounted in offset relation relative the center of draft of the plow, the latter being assumed to lie in the plane of the plow frame. It will be noted, that the line b—b intersects the pivot point A of the tractor and an assumed working center of the plow share, it having been found by trial with a Beeman tractor equipped with the invention, that, in operation the plow appears to work without any undue vibration or side tremor, and the tractor with less steering effort and very apparently with greater ease, as the plow pivot 33 is set nearer to the resultant line d—d. For the purpose of adjusting the plow laterally, the sleeve 35 may be slid on the bar 36, the top and bottom walls 37 and 38 of the interior of the sleeve diverging outwardly from a point midway between its ends, so that the bar may be held positioned at various angles by the set screws 39, as shown in dotted lines (Fig. 10) whereby the plow may be set to cut a level bottom in the furrow.

Firmly secured to sheth 18 of the plow frame, and extending inwardly to a position adjacent the tractor draft line is the arm 40, formed, preferably, with a longitudinally disposed threaded stud 41 extending through the plow frame and having threaded engagement with suitable nuts (not shown) whereby it may be held positioned. A suitable strut brace 42 extending to the plow frame is provided. Adjustable longitudinally on the arm 40, are the straps 43, each having a row of bolt holes 44 in vertical register, said holes also registering with holes cut vertically through said arm as indicated in dotted lines, whereby the straps may be bolted firmly in place. At their outer ends the straps rotatably support the anti-friction roller 45, as by means of the vertical spindle 46. In operation, (the plow being positioned as indicated in Fig. 1), the roller 45 is adjusted to contact with the shield 14 of the caster wheel, so as to hold the latter at an angle, (as shown in Figure 11) to cause it to travel in the direction of line h—h toward the plow. In its endeavor to reassume its normal straight ahead course, a constant pressure is exerted against the roller 45, thereby effectively counteracting the side draft at the land side f of the plow share. Thus, the caster operates as a ground element the wheel 13 thereof bracing against the ground in opposition to a pivotal movement of the tractor around the pivot A, or around its traction wheel C as a pivot.

Further, as the point of attachment 8 of the ground element to the draw head, is offset from the tractor draft line, in opposition to the plow pivot 33, the pull at 8 largely neutralizes the pull of the plow, especially, since the greater the angle of the line h—h, the greater the ground resistance to the dragging action at the periphery of the wheel 13. By adjusting the brace member 9, the ground element may be swung outwardly (dotted lines Fig. 11) to a position farther removed from the plow, whereby the resistance offered by the dragging action of the caster in opposition to the pull of the plow, may be materially increased.

Referring to Figure 5 of the drawings, the stud 41 is formed with a squared part 46', fitting the squared opening 47 in the handle 48, the latter extending rearwardly from the plow frame, whereby the plow may be lifted to out of use position, to bring the arm 40 to rest on the seat 16' of the plow support 16, as shown in dotted lines in Figure 2. When the plow is in inoperative position the ground element serves solely to stabilize the tractor, the caster, yielding to the turning movement of the latter.

We claim:

1. A plow hitch for use in connection with a wheeled frame, a draw head adapted to be attached to the wheeled frame, a plow, the share thereof being spaced from the center of draft of the wheeled frame to plow outside the path of the latter, a rearwardly extending ground element attached to said draw head at a position spaced from the center of draft of the wheeled frame in a direction opposite to that of the plow, means for pivotally connecting the plow to said draw head, the ground engaging part of said ground element loosely contacting with said plow and having a ground cutting edge adapted to cut into the ground at such an angle as to be thereby forced in the direction of the plow in the process of plowing.

2. A plow hitch for use in connection with a wheeled frame, a draw head adapted to be attached to the wheeled frame, a plow, the share thereof spaced from the center of draft of the wheeled frame to plow outside the path of the latter, a ground element attached to the draw head, said ground element including a caster wheel positioned adjacent the landside of the plow, means for pivotally connecting the plow to said draw head, and adjusting means for the ground element whereby the latter may be set to hold said caster wheel against the plow at such an angle as to steer it toward the latter.

3. A plow hitch for use in connection with a wheeled frame, a draw head adapted to be connected to the wheeled frame, a plow pivotally connected to the draw head, the share of the plow being spaced from the center of draft of the wheeled frame so as to plow outside the path of the latter, and means attached to the draw head extending along the landside of the plow to a part of the latter to contact therewith and with the ground to frictionally engage same at such an angle as to effect a sidewise pressure against the plow in the process of plowing.

4. A plow hitch, for use in connection with a wheeled frame, comprising a draw head adapted to be attached to the wheeled frame, a plow, the share thereof positioned so as to plow outside the path of the wheeled frame, a ground element adjustably connected to said draw head, said ground element including a caster wheel held at such an angle to contact with the plow as to exert pressure thereagainst when drawn in straight ahead direction, and a pivotal connection between the plow and said draw head to render the plow swingable laterally, said pivotal connection being located in laterally spaced relation to the landside of the plow and to the center of draft of the wheeled frame.

5. In a plow hitch, the combination with a tractor including a stabilizing trailing caster wheel, of a draw head on the tractor, a plow pivotally connected to said draw head, said plow being spaced from the center of draft of the tractor so as to plow to the edge of the trail of the latter, and adjustable means between said caster wheel and plow operatively connected to both, whereby said caster wheel may be constantly held in selective positions concurrently with its stabilizing action upon the tractor, to travel toward the plow to effect a constant pressure thereagainst in the process of plowing.

6. In a plow hitch, the combination with drawing means, of a plow offset from the center of draft of said drawing means, a trailing caster wheel laterally opposite the landside of the plow, and means operative from the plow to control the caster to effect a compensating bodily movement of the caster responsive to a landward movement of the plow.

7. In a plow hitch, the combination with drawing means, of a plow offset from the center of draft of said drawing means, a trailing ground element laterally opposite the landside of the plow, and means operative from the plow to cooperate with the ground element to effect a compensating bodily movement of the ground element responsive to a landward movement of the plow.

In testimony whereof we affix our signatures.

PAUL HANSMANN.
HERMAN STRACK.